April 10, 1951 O. E. ECKHOFF 2,548,524
ELECTRICAL COOKING APPARATUS
Filed Nov. 22, 1948 9 Sheets-Sheet 1

Inventor
Orville E. Eckhoff
By Clarence A. O'Brien
and Harvey B. Jacobson
Attorneys April 10, 1951 — O. E. ECKHOFF — 2,548,524
ELECTRICAL COOKING APPARATUS
Filed Nov. 22, 1948 — 9 Sheets-Sheet 2

Inventor
Orville E. Eckhoff

April 10, 1951     O. E. ECKHOFF     2,548,524
ELECTRICAL COOKING APPARATUS Filed Nov. 22, 1948     9 Sheets-Sheet 4

Inventor

Orville E. Eckhoff

By *Clarence A. O'Brien and Harvey B. Jackson*
                                          Attorneys

Inventor
Orville E. Eckhoff

April 10, 1951     O. E. ECKHOFF     2,548,524
ELECTRICAL COOKING APPARATUS

Filed Nov. 22, 1948     9 Sheets—Sheet 6

Inventor
Orville E. Eckhoff

By Clarence A. O'Brien
and Harvey B. Jacobson
Attorneys

Patented Apr. 10, 1951

2,548,524

UNITED STATES PATENT OFFICE 2,548,524

ELECTRICAL COOKING APPARATUS

Orville E. Eckhoff, San Antonio, Tex.

Application November 22, 1948, Serial No. 61,377

8 Claims. (Cl. 99—331)

This invention relates to electrical apparatus for broiling, toasting, and otherwise cooking foodstuffs, and has more particular reference to that type of cooking apparatus in which foodstuffs are subjected to the action of overhead heating elements while being conveyed longitudinally of and through an elognated oven.

The primary object of the present invention is to provide an apparatus of the above kind by means of which a plurality of different foodstuffs, which require different degrees of heat for proper cooking thereof, may be simultaneously cooked.

More specifically, the present invention contemplates the provision of a cooking apparatus of the above kind including an elongated oven having a plurality of longitudinal cooking channels, overhead electrical heating elements of different maximum heating capacities in the upper portions of the respective cooking channels, thermostatically controlled means for varying the degrees of heat produced by said heating elements so as to maintain predetermined different degrees of heat within the respective channels, and an endless conveyor for moving foodstuffs through said channels beneath the heating elements.

Another object of the present invention is to provide an apparatus of the above kind including an elongated oven having a longitudinal flue into which cooking fumes and heat may pass from the cooking channels, and means including a suction fan for drawing fumes and excess heat into said flue and exhausting the same from the latter at a predetermined rate so as to prevent passage of the excess heat from one cooking channel to another and thereby maintain the desired different degrees of heat in the respective channels.

A further object of the present invention is to provide a comparatively simple and compact apparatus of the above kind which is rendered highly efficient in operation by certain novel features and details of construction thereof.

Still another object of the present invention is to provide an apparatus of the above kind whose cooking capacity may be readily increased substantially 100% or reduced substantially 50% in accordance with changes in the volume of business being done by the establishment employing the apparatus.

The exact nature and other objects of the present invention will become apparent from the following description when considered with the accompanying drawings, in which:

Referring in detail to the drawings, the illustrated form of the present invention embodies a hollow base which includes an elongated horizontal supporting frame 5 having corner legs 6 and intermediate legs 7 at each side. Mounted within the top of frame 5 and spaced from the sides and ends of the latter is a pan 8 filled with slabs 9 of heat insulating material. The frame 5 and the major upper portions of its supporting legs are encased at the sides and ends of the base by walls 10 whose lower edges terminate above the lower ends of the legs and provide a space 11 and for the entrance of cooling air into the base. The walls 10 have doors 12 to facilitate access to parts of the apparatus located within the base framework.

Mounted on the top of frame 5 along the sides of pan 8 are longitudinal angle iron rails 13 which face outwardly and form tracks for rollers 14 provided on the bottom of the side portions of a hood 15 that coacts with the pan 8 and its slabs 9 to form an elongated open-ended oven, said pan and its slabs forming the bottom wall of said oven. By means of the rollers 14 and tracks 13, the hood 15 is readily removable from the base longitudinally of the latter.

The hood 15 includes spaced outer and inner shells 16 and 17, and the space between these shells is filled with fibrous heat insulating material 18. The inner shell 17 is offset upwardly intermediate the sides thereof as at 18 to form a horizontal longitudinal flue 19 having an outlet duct 20 at one end that is connected by a conduit 21 to the inlet of a remote variable speed exhaust or suction fan 22. Supported by and depending from the inner shell 17 along opposite sides of the flue 19 are spaced vertical longitudinal partitions 23, and substantially bridging the space between these partitions between the top and bottom of the latter is a removable heat reflecting plate 24 that forms the bottom of flue 19. The partitions 23 divide the interior of hood 15 into a central longitudinal high temperature cooking channel 25 and side longitudinal low temperature cooking channels 26.

Figures 12, 13:
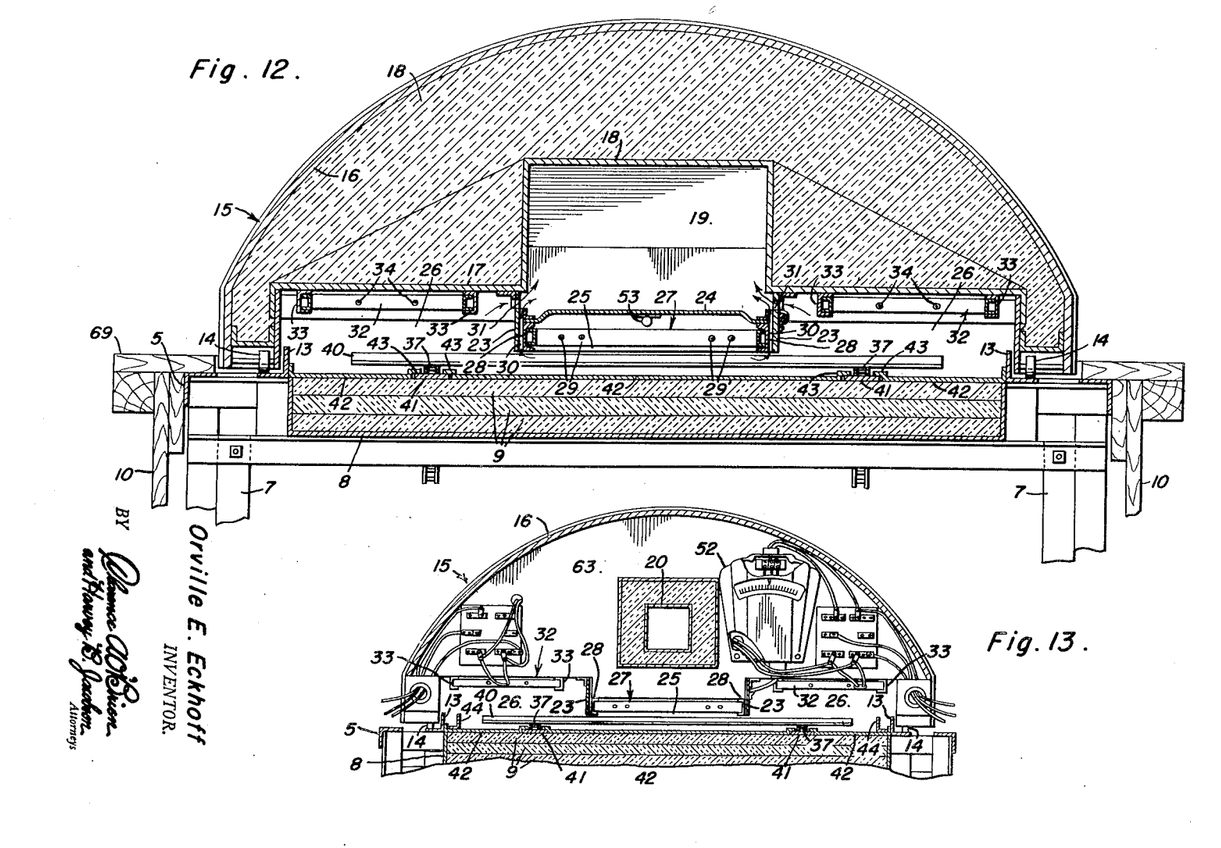
Figure 12 is an enlarged transverse vertical section taken on the line 12—12 of Figure 6.
Figure 13 is a transverse vertical section taken on the line 13—13 of Figure 6.
Figure 14:
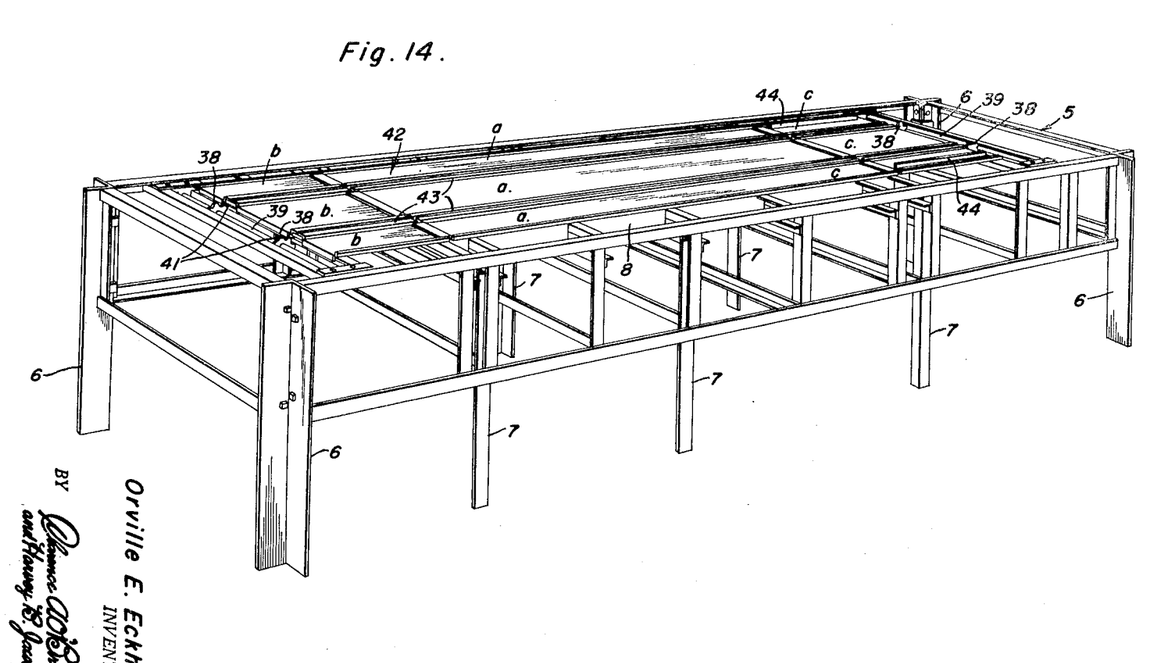
Figure 14 is a perspective view of the supporting frame with the bottom heat reflecting plates and glide strips disposed thereon.

An electrical heating unit 27 is removably supported within the upper portion of cooking channel 25 by means of channel guides 28 carried by the partitions 23, which unit includes a frame in which are mounted two resistors 29 and 29'. Draft spaces 30 (Figure 12) are provided between the cooking channel 25 and the flue 19 at the inner sides of partitions 23, and the upper portions of partitions 23 are formed with draft slots 31 that afford communication between the cooking channels 26 and the flue 19. An electrical heating element 32 is removably supported within the upper portion of each cooking channel 26 by means of channel guides 33 attached to the shell 17, each element 32 comprising a frame having a resistor 34 mounted therein. The resistors 34 are of a lower maximum heating capacity than each of the resistors 29 and 29' so that foodstuffs are subjected to a higher degree of heat in the channel 25 than in the channels 26.

Different foodstuffs to be cooked by means of the present apparatus are placed in different depressions or compartments 35 of trays 36, and an endless motor-driven conveyor is provided to carry the trays of food at a slow speed through the oven. The conveyor includes a pair of spaced endless chains 37 which pass around the sprocket wheels 38 secured on transverse shafts 39 journaled in the top and adjacent the opposite ends of frame 5, said chains being connected by a continuous series of transverse angle bars 40 arranged in pairs so that a pair of the trays 36 may be disposed end to end between the vertical flanges and supported upon horizontal flanges of each pair. Two trays may be placed in end to end relation upon each pair of bars 40 so that the foodstuffs in certain compartments of both trays are disposed to pass through the high temperature cooking channel 25, those in other compartments of one tray pass through one low temperature cooking channel 26, and those in other compartments of the other tray pass through the other low temperature cooking channel 26. The portions of shell 17 above the heating elements 32 form top heat reflectors for the cooking channels 26. The upper flight of the conveyor moves through the oven above the bottom wall 8, 9 and below the heating elements 29, 29' and 34, and in this flight the chains 37 slide on flat metal glide or wear strips 41 loosely laid on the top of slabs 9 and on portions of frame 5 beyond the ends of the wall 8, 9. Suitably secured on the bottom wall 8, 9 and on the portions of frame 5 beyond the ends of said wall between and at opposite sides of the strips 41 are metal crumb trays 42 that have upwardly offset side flanges 43 which overlie the side marginal portions of the strips 41 and hold the latter down in place and in a flat condition. Thus, the strips 41 may expand longitudinally, when heated, without buckling. Sufficient clearance is provided between the trays 42 and the side edges of strips 41 to allow such lateral expansion of the latter as occurs when the same become heated when the apparatus is in use. In this way, the upper flight of the conveyor moves in a flat horizontal path parallel with the heating elements, so that the partitions 23 may extend into close proximity to the trays and efficient uniform cooking is insured. Each crumb tray 42 includes a long intermediate section $a$, and shorter end sections $b$ and $c$. The crumb trays form heat reflectors for the bottoms of the cooking channels, and the side crumb trays butt the rails 13 at their outer sides. To aid in properly positioning the food trays 36 on the conveyor at the feed end of the machine, short rails 44 are secured on and at the outer sides of the end sections $c$ of the outer or side crumb trays, the outer ends of said food trays being butted against said rails 44 after being placed on the conveyor. The space 11 provides toe room and allows a free draft of air through the base to cool the motor, the reduction gearing, and the lower flight of the conveyor as it moves in the base beneath the bottom wall 8, 9 of the oven.

Figure 11:
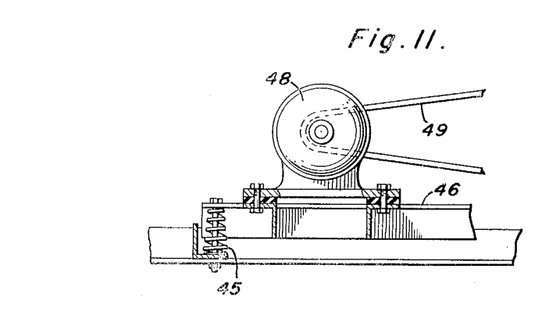
Figure 11 is a fragmentary view, partly in side elevation and partly in section, showing the driving motor for the conveyor and its mounting.

Supported within one end of the base upon springs as indicated at 45 (Figure 11) is a yieldable platform 46 upon which is secured an encased change-speed reduction gearing 47 and a motor 48. A belt drive 49 is provided between motor 48 and gearing 47, and a sprocket drive 50 is provided between gearing 47 and the conveyor shaft 39 at the discharge end of the machine. In this way, the conveyor is driven by pulling the upper flight thereof so as to aid in keeping said flight in a flat condition. The volume of fumes drawn by fan 22 through conduit 21 from the cooking channels by way of flue 19 is controlled by an adjustable damper 51 provided in said conduit. Thus, when the damper is properly adjusted, passage of heat from one cooking channel to another may be prevented without materially reducing the heat in any of said channels, thereby making it possible to attain the proper different temperatures in the respective high and low temperature cooking channels.

Figure 1:
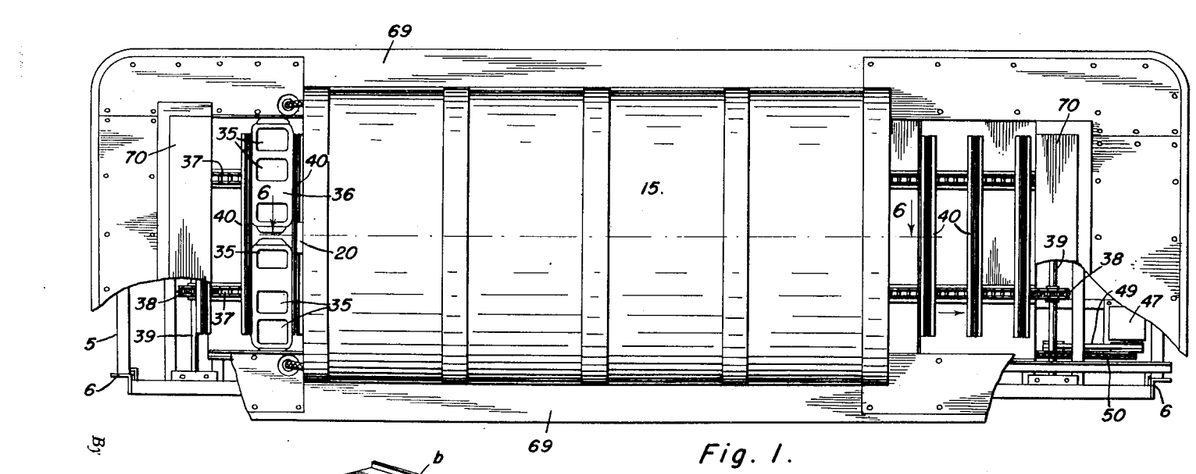
Figure 1 is a top plan view, partly broken away and with parts omitted of a cooking apparatus constructed in accordance with the present invention.
Figure 2:
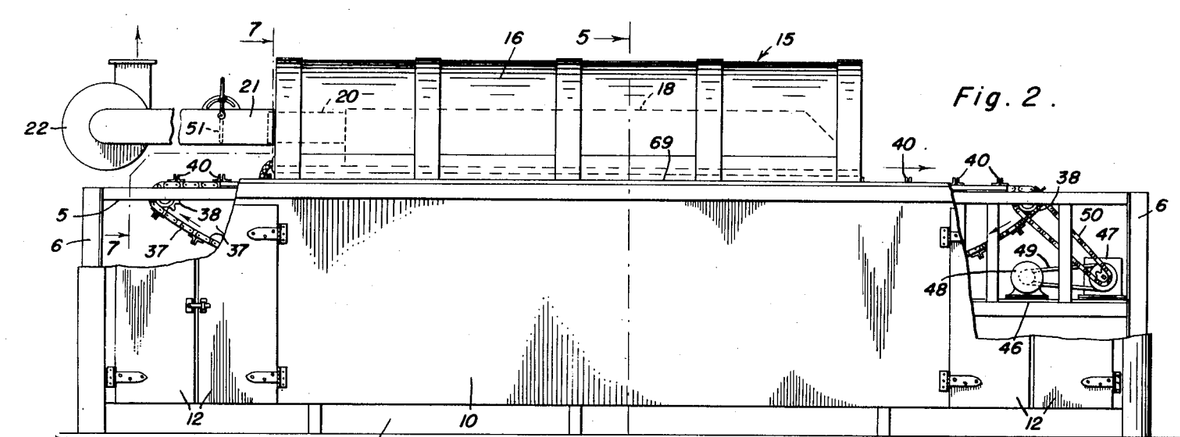
Figure 2 is a side elevational view thereof, partly broken away and with parts removed.
Figures 3, 4:
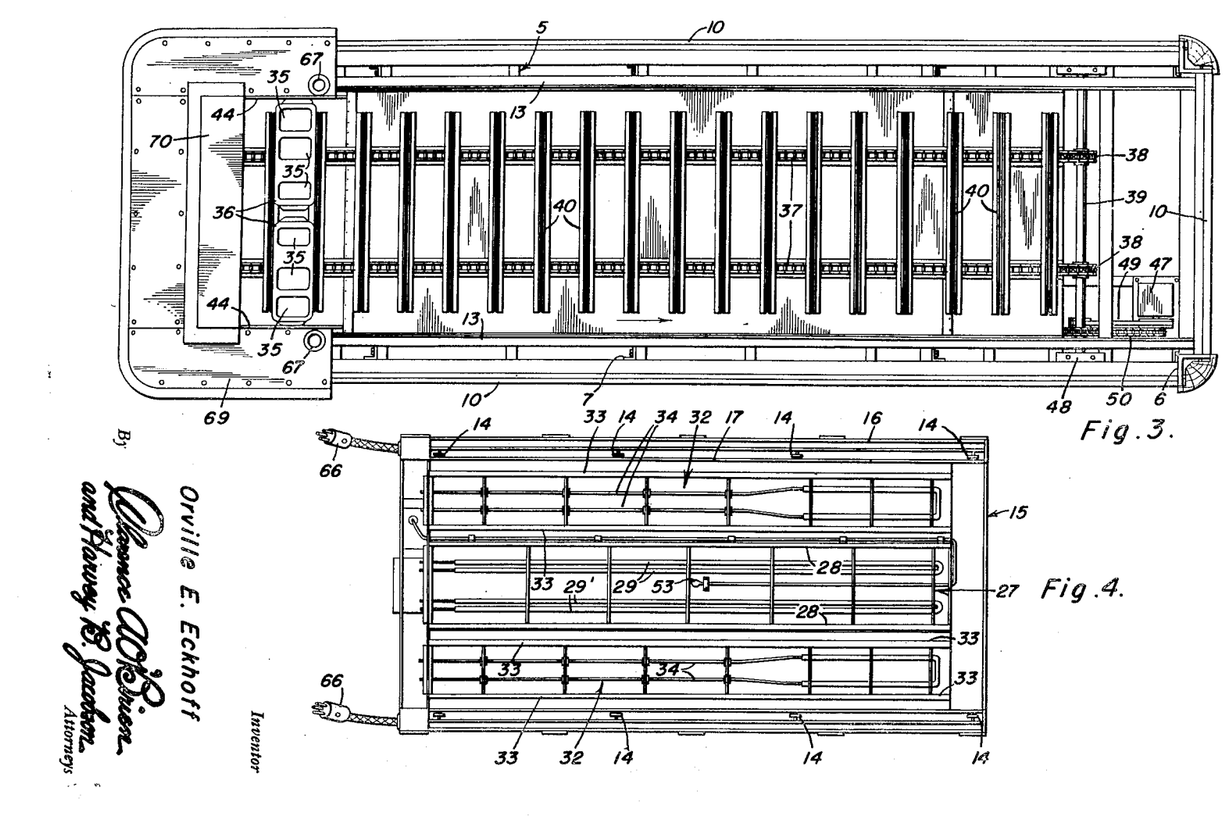
Figure 3 is a top plan view of the apparatus with the hood and other parts removed.
Figure 4 is a bottom plan view of the hood with the heating elements in place.
Figure 5:
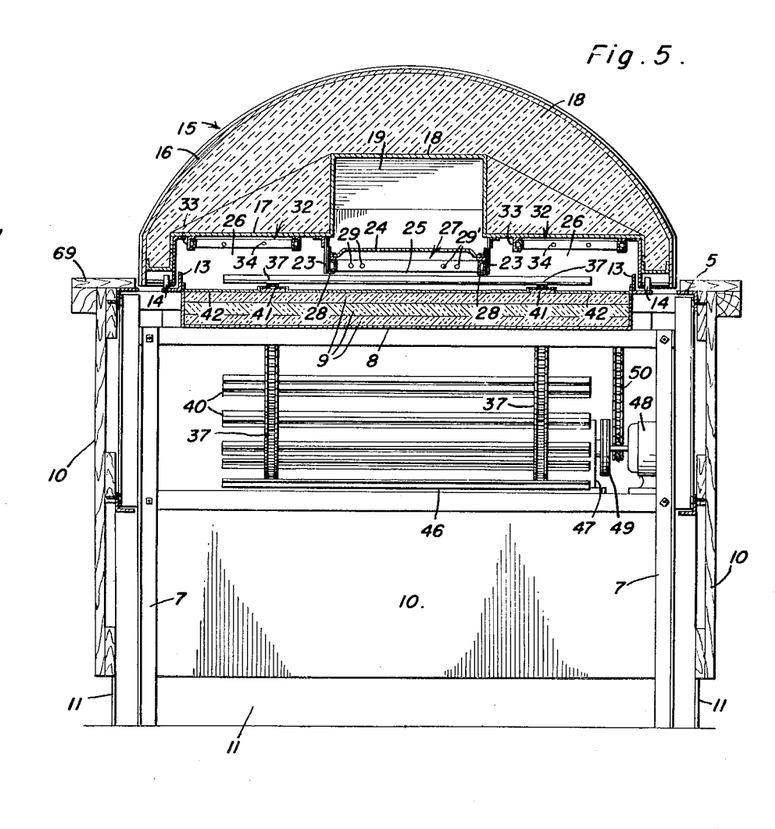
Figure 5 is a transverse vertical section taken on the line 5—5 of Figure 2.
Figure 6:
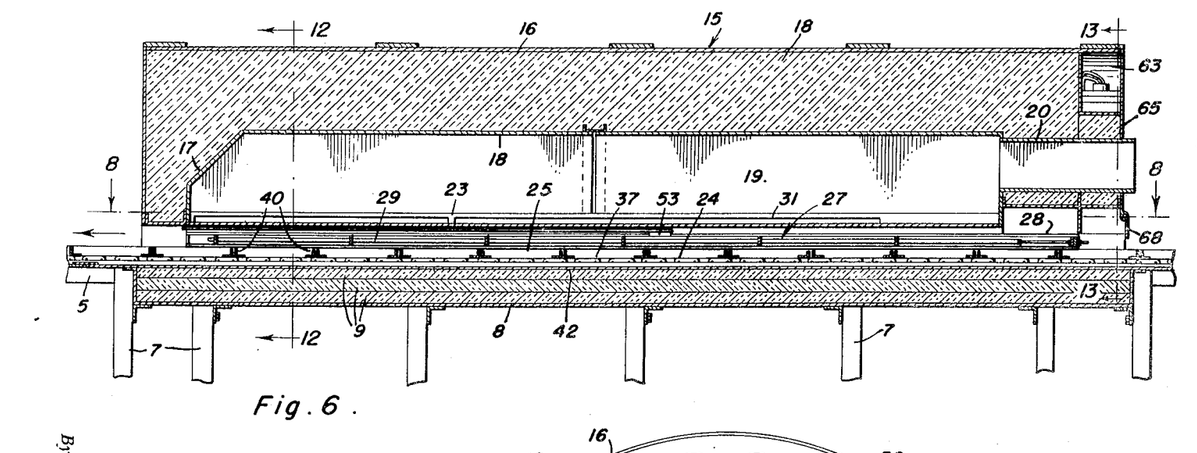
Figure 6 is an enlarged fragmentary vertical longitudinal section taken on the line 6—6 of Figure 1.
Figure 7:
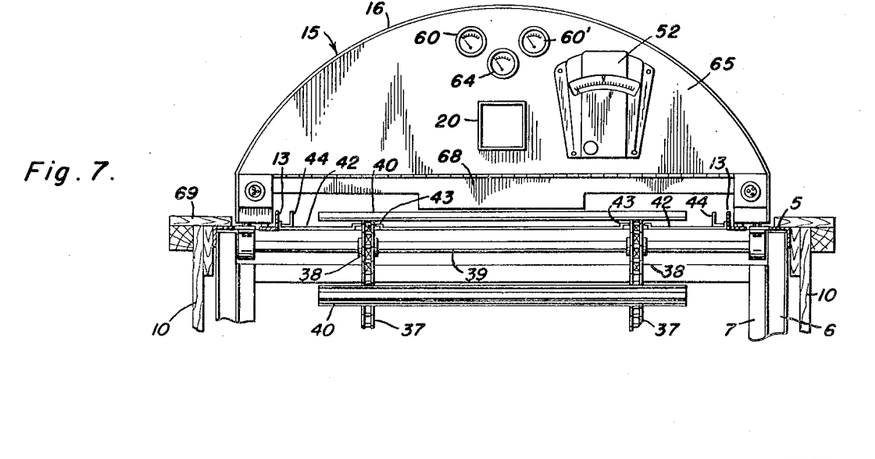
Figure 7 is an enlarged fragmentary transverse vertical section taken on the line 7—7 of Figure 2.
Figure 8:
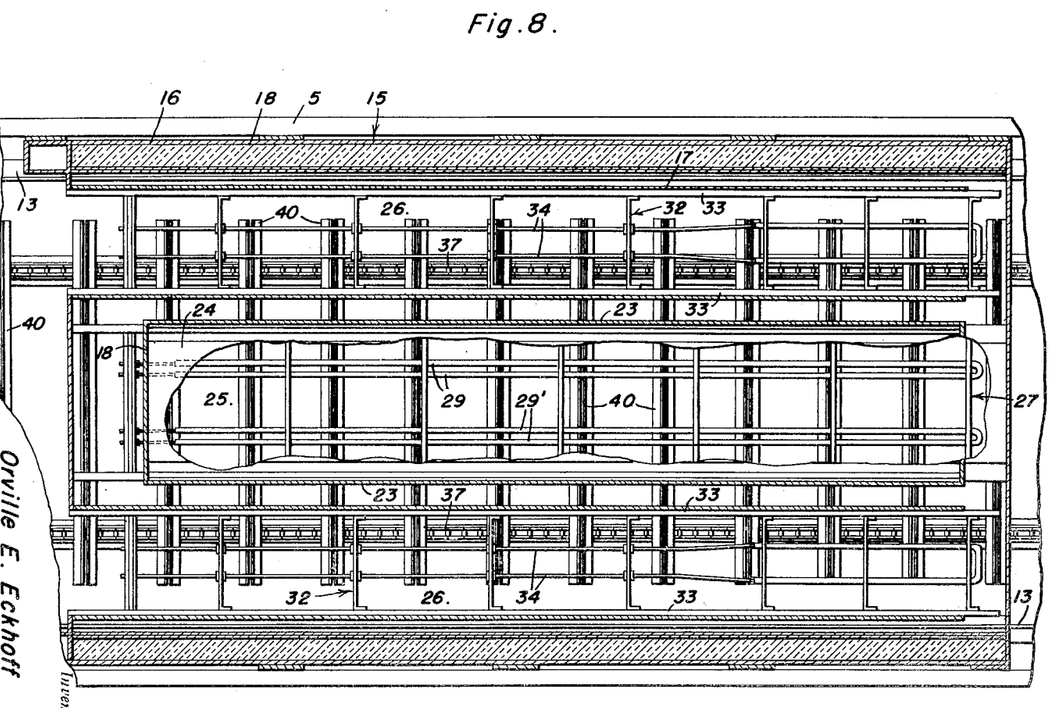
Figure 8 is an enlarged fragmentary horizontal section taken on the line 8—8 of Figure 6, with parts broken away.
Figure 9:
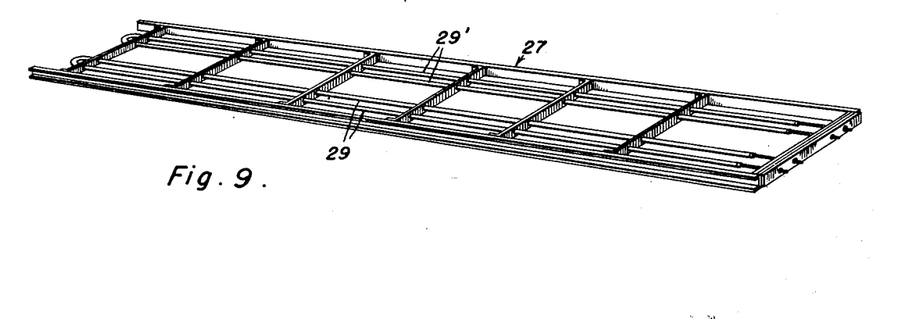
Figure 9 is a perspective view of the heating unit for the high temperature cooking channel.
Figure 10:
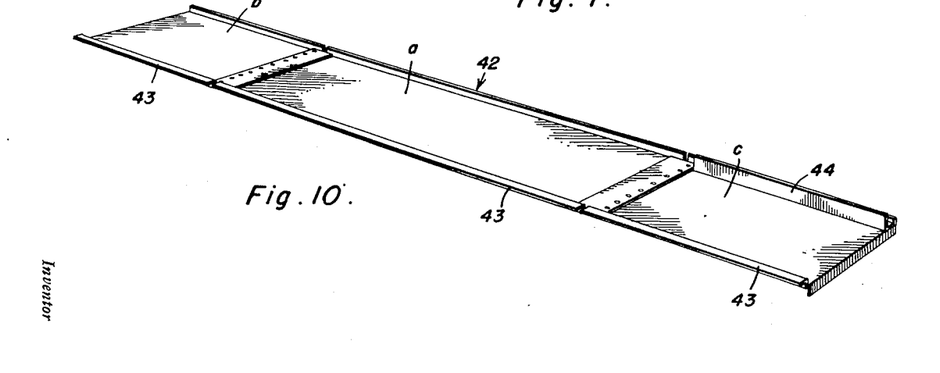
Figure 10 is a perspective view, partly broken away, of the bottom heat reflector for one of the low temperature cooking channels.
Figure 15:
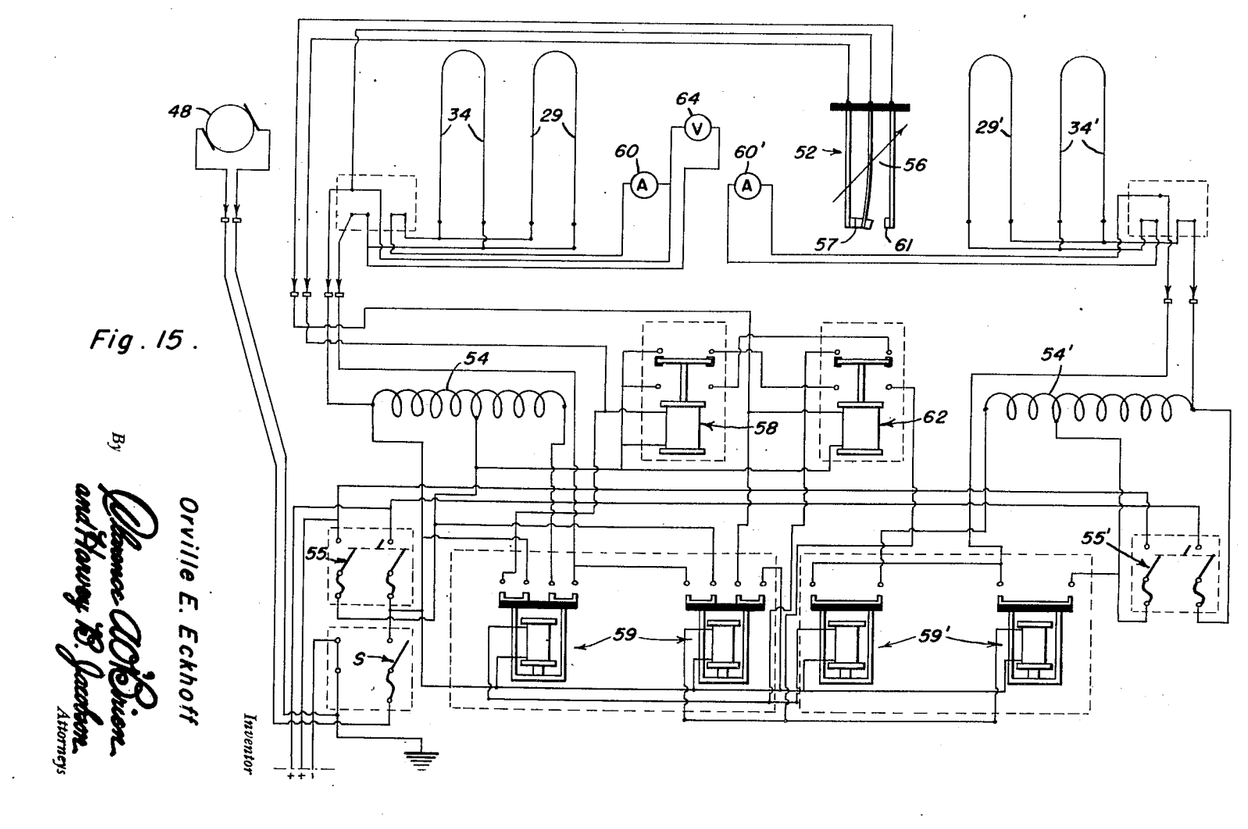
Figure 15 is a diagram showing the manner in which the electrical elements of the apparatus are wired.

The temperature in the cooking channels is controlled by an adjustable thermostat 52 whose thermo-sensitive element 53 (Figures 4 and 6) is located on the under side of reflector plate 24 substantially midway between the ends of the oven. The machine includes a system of electrical circuits which is shown in Figure 15 and which is designed to produce the desired heat in the cooking channels. The amount of heat generated by the heating elements is controlled by the use of auto-transformers 54 and 54' and the thermostat 52, so as to change service line voltage to the voltage required at the heating elements. When switches 55 and 55' are closed, the thermostat switch arm 56 comletes a circuit through the contact 57, and the coil of relay 58 is energized so as to complete a circuit through the coils of the electro-magnetic contactors 59 and 59'. This causes the contactors to close high voltage circuits through the transformers, all of the heating elements, and the ammeters 60 and 60', thereby producing maximum heat in the cooking channels. When the thermostat switch arm 56 completes a circuit through contact 61, the coil of relay 62 is energized to complete a circuit through the coils of contactors 59 and 59' so that the latter close low voltage circuits through the transformers, all of the heating elements, and the ammeters. In this way uniform predetermined temperatures are automatically maintained in the cooking channels. When switch 55' is opened, the circuits through transformer 54' to one heating element 34 and the heating element 29' are broken, thereby permitting use of the heating element in only one low temperature cooking channel and one heating element in the high temperature cooking channel. This enables economy of operation with a single file of food trays on the conveyor during dull business periods. Switch S is provided to control the operation of motor 48. The circuits and arrangement of electrical devices therein are merely the result of electrical skill and form no specific part of the present invention. Accordingly, the wiring diagram can be readily understood by an electrician and need not be described in more detail herein. All of the electrical devices are of conventional types, the contactors, for instance, being of the type shown in the U. S. patent to H. L. Van Valkenburg et al. No. 2,304,972, December 15, 1942. The thermostat 52, ammeters 60 and 60', and a voltmeter 64 included in the circuits of the heating elements, are mounted in a covered chamber 63 provided in one end of the hood and behind apertures in the cover 65 of said chamber. The electrical devices carried by the hood are wired to cables carrying male members 66 of two-part connectors adapted to be passed through holes 67 in the top of the base and plugged into female members of said connectors disposed beneath the top of the base adjacent said holes. The remaining electrical devices are suitably mounted on and within the base so as to be easily accessable through the doors 12, or otherwise. By pulling the male connector members 66 out of engagement with the female connector members, the hood may be removed to permit ready cleaning of the crumb trays 42 and glide strips 41. The heating elements are readily slidable endwise out of the hood to facilitate repair thereof, and a hinged door 68 partially closes the cooking channels at the entrance ends thereof. A counter-like ledge 69 is provided on the top and along the sides and ends of frame 5, and removable covers 70 are provided over the conveyor shafts 39 and sprocket wheels 38. Ledge 69 has a removable section at the discharge end of the apparatus so that the adjacent ends of rails 13 may be uncovered to permit rolling of the hood 15 off of the base.

The operation of my improved apparatus is believed to be apparent. With switch 55 closed, closing of switch S will set motor 48 in motion so as to drive the endless conveyor in the direction indicated by arrows and at the speed determined by the setting of the gearing 47. Closing of switch 55 closes the circuits of one heating element 34 and the heating element 29, and by closing switch 55' the circuits of the other heating element 34 and the heating element 29' are closed. As the cross bars 40 move into view before the entrance end of the oven, the trays 36 are placed in end to end relation on the horizontal flanges and between the vertical flanges of a pair of said cross bars, the foods being placed in the trays so that those of both trays requiring a relatively high degree of heat for cooking thereof will pass through the cooking channel 25 and those of the respective trays requiring a lower degree of heat will pass through the respective cooking channels 26. Of course, the fan 22 will have been set in motion, and damper 51 will have been approximately adjusted by this time. Should the temperature in the cooking channels rise above a degree predetermined by adjustment of thermostat 52, thermostat switch arm 56 will close a circuit through contact 61 and the coil of relay 62 so that the latter will complete a circuit through the coils of contactors 59 and 59', and the latter will close the low voltage circuits through the transformers and the heating elements, thereby reducing the degree of heat generated by the latter. On the other hand, should the temperature in the cooking channels lower below a predetermined degree, thermostat switch arm 56 will close a circuit through contact 57 and the coil of relay 58 so that said relay completes a circuit through the coils of contactors 59 and 59' and the latter close high voltage circuits through the transformers and the heating elements, thereby increasing the degree of heat generated by the latter. In this way, the temperatures in the cooking channel 25 and in the cooking channels 26 are automatically maintained at predetermined different degrees for proper cooking of the different foods in the trays 36 as the latter are moved through the oven by the conveyor. Excess heat is drawn from the cooking channels by fan 22 under control of damper 51, so that such excess heat will not pass from channel 25 to channels 26 and unduly raise the temperature in the latter channels, and so that cooking fumes and the like may be removed from the cooking channels and discharged outside the place in which the apparatus is used. The effect and purpose of opening switch 55' and leaving switches S and 55 closed has already been explained.

From the foregoing description, it is believed that the construction, operation and advantages of the present invention will be apparent to those skilled in the art. Modifications and changes in details of construction are contemplated, such as fairly fall within the spirit and scope of the invention as claimed.

What is claimed as new is:

1. An electrical cooking apparatus including an elongated oven having a longitudinal flue and a cooking chamber, longitudinal partitions depending from the top of said chamber and dividing the same into an intermediate and two side cooking channels communicating with said flue, a first overhead electrical heating element in the upper portion of the intermediate cooking channel, further similar overhead electrical heating elements of lower heating capacity than the first heating element respectively disposed in the upper portions of the side cooking channels, an exhaust fan for withdrawing fumes and excess heat from said cooking channels through said flue, and an endless conveyor having its upper flight arranged to carry foods through said channels beneath the heating elements.

2. The construction defined in claim 1, in combination with thermostatically controlled means for varying the degrees of heat produced by said heating elements to maintain a predetermined degree of heat in the intermediate cooking channel and a lower predetermined degree of heat in the side cooking channels.

3. The construction defined in claim 1, in combination with a heat reflector plate supported by and substantially bridging said partitions so as to form the bottom of said flue and the top of said intermediate cooking channel.

4. The construction defined in claim 1, in combination with a heat reflector plate supported by and substantially bridging said partitions so as to form the bottom of said flue and the top of said intermediate cooking channel, there being draft spaces between the intermediate cooking channel and the flue at the inner sides of said partitions.

5. The construction defined in claim 1, in combination with a heat reflector plate supported by and substantially bridging said partitions so as to form the bottom of said flue and the top of said intermediate cooking channel, said partitions having draft slots above said heat reflector plate.

6. The construction defined in claim 1, wherein the heating element in the intermediate cooking channel is disposed at a lower level and closer to the upper flight of the conveyor than the heating elements in the side cooking channels.

7. The construction defined in claim 1, in combination with a pair of longitudinal guide channels mounted in the upper portion of each cooking channel and having a heating element slidably and removably supported therein.

8. An electric cooking apparatus including an elongated oven partitioned to provide a plurality of longitudinal open-ended cooking channels, overhead electrical heating elements of different heating capacities in the upper portions of the respective cooking channels, and means to move trays of foods requiring different degrees of heat for cooking through said oven beneath the several heating elements, said means includes a pair of spaced endless chains and pairs of cross bars connecting said chains and adapted to support trays of food, in combination with glide strips for the chains loosely laid on the bottom of said oven, and crumb trays secured on the bottom of the oven between and at the outer sides of said glide strips, said crumb trays having side flanges overlying the side margins of said glide strips to hold the latter down in flat condition while permitting longitudinal and lateral expansion thereof.

ORVILLE E. ECKHOFF.

REFERENCES CITED

The following references are of record in the file of this patent:

UNITED STATES PATENTS

| Number | Name | Date |
| --- | --- | --- |
| 1,524,532 | Biebel | Jan. 27, 1925 |
| 1,536,538 | Stouffer | May 5, 1925 |
| 1,560,220 | DeMatteis | Nov. 3, 1925 |
| 1,660,061 | Addison | Feb. 21, 1928 |
| 1,662,847 | Cook | Mar. 20, 1928 |
| 1,667,988 | Richardson | May 1, 1928 |
| 1,731,743 | Harrison | Oct. 15, 1929 |
| 1,832,374 | Forby et al. | Nov. 17, 1931 |
| 1,933,590 | Schlemm | Aug. 22, 1933 |
| 2,120,829 | Bolling | June 14, 1938 |
| 2,149,537 | Norton | Mar. 7, 1939 |
| 2,201,801 | Stavrou | May 21, 1940 |
| 2,238,309 | Cramer | Apr. 15, 1941 |
| 2,369,274 | Beatty | Feb. 13, 1945 |
| 2,483,681 | Van Der Neut | Oct. 4, 1949 |